United States Patent
Westerberg (10) Patent No.: US 6,847,651 B1
(45) Date of Patent: Jan. 25, 2005

(54) METHODS AND MEANS FOR TELECOMMUNICATION

(75) Inventor: Lars Erik Westerberg, Enskede (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 763 days.

(21) Appl. No.: 09/608,229

(22) Filed: Jun. 30, 2000

(30) Foreign Application Priority Data

Jul. 2, 1999 (SE) .............................................. 9902553

(51) Int. Cl.⁷ ................................................. H04J 3/16
(52) U.S. Cl. ....................... 370/437; 370/433; 370/436; 370/468
(58) Field of Search ................................ 370/330, 314, 370/315, 320, 321, 326, 328, 334, 335, 336, 337, 338, 339, 342–347, 352, 353, 354, 356, 466, 467, 468, 469, 433, 435, 437

(56) References Cited

U.S. PATENT DOCUMENTS

| | | | | |
|---|---|---|---|---|
| 5,511,072 A | * | 4/1996 | Delprat ........................ | 370/336 |
| 5,521,925 A | * | 5/1996 | Merakos et al. ............ | 370/337 |
| 5,790,551 A | * | 8/1998 | Chan .......................... | 370/458 |
| 5,793,744 A | * | 8/1998 | Kanerva et al. ............ | 370/209 |
| 6,005,852 A | * | 12/1999 | Kokko et al. ................ | 370/329 |
| 6,038,238 A | * | 3/2000 | Jokinen et al. ............. | 375/130 |
| 6,044,266 A | * | 3/2000 | Kato ........................ | 455/422.1 |
| 6,055,497 A | * | 4/2000 | Hallkvist et al. ........... | 704/228 |
| 6,282,182 B1 | * | 8/2001 | Pecen et al. ................ | 370/336 |
| 6,359,866 B1 | * | 3/2002 | Svensson et al. ........... | 370/331 |
| 6,393,000 B1 | * | 5/2002 | Feldman ..................... | 370/316 |
| 6,477,176 B1 | * | 11/2002 | Hamalainen et al. ....... | 370/435 |

FOREIGN PATENT DOCUMENTS

| | | |
|---|---|---|
| WO | 96/09708 | 3/1996 |
| WO | 96/13916 | 5/1996 |
| WO | 98/57509 | 12/1998 |

* cited by examiner

*Primary Examiner*—Dang Ton
*Assistant Examiner*—Tri H. Phan
(74) *Attorney, Agent, or Firm*—Roger S. Burleigh (57) ABSTRACT

A method for communicating packet data units in a radio communication system having a first base station that supports both speech and data packet communication with a number a radio units, wherein the first base station includes a first transceiver unit communicating a speech call with a first radio unit on a speech traffic channel mapped on a first basic physical channel, and where a discontinuous transmission mode can be activated on the first speech traffic channel, characterized in that the method comprises the step of communicating packet data units between the first transceiver unit and a second radio unit on a packet data channel mapped on a second basic physical channel when the discontinuous transmission mode is activated on the first speech traffic channel.

12 Claims, 6 Drawing Sheets

METHODS AND MEANS FOR TELECOMMUNICATION

TECHNICAL FIELD OF THE INVENTION

The present invention relates in general to the field of cellular radio communication and, in particular, to methods and means for transmitting and receiving packet data units in a cellular radio communication system.

DESCRIPTION OF RELATED ART

Cellular radio communication systems are commonly employed to provide speech and data communication to a plurality of subscribers with radio units.

By "radio unit" is meant all portable and non-portable equipment intended for radio communication, like mobile/cellular phones, transceivers, pagers, telex, electronic notebooks, laptops with integrated radios, communicators, computers, routers, tailored microchips or any other electronic equipment using a radio link as a means of communication. These equipments can be used in any type of radio communication system, such as cellular networks, satellite or small local networks.

A cellular radio communication system, e.g. AMPS, NMT, D-AMPS, GSM, and IS-95 (CDMA), generally includes one or more radio units, one or more base stations (e.g. base transceiver stations), one or more base station controllers (BSC) and at least one mobile switching centre (MSC). The system may also include one or more data packet routing units like a serving GPRS support node (SGSN) and/or a GPRS support node (GGSN) in GPRS. A typical cellular radio communication system may include hundreds of base stations, thousands of radio units and more than one mobile switching centre.

The geographical area covered by a cellular radio communication system is typically divided into a number of cells or regions, i.e. small parts of the geographical area. The cells typically include a base station and the radio units with which the base station is in communication. The cell associated with the particular base station with which a radio unit is communicating (i.e. transmitting and/or receiving) is commonly called the serving cell.

Each base station will have allocated to it one or more speech traffic channels and/or packet data channels and in some cases. one or more dedicated control channels. These channels are used for communication between the base station and the radio units within the cell.

With a basic physical channel is meant a radio channel used for communication between a base station and one or more radio units. In a FDMA system, a basic physical channel is defined as a frequency. In FDMA/TDMA systems like D-AMPS, GSM and GPRS, a basic physical channel is defined as a timeslot and a frequency (in a non-frequency hopping system) or a timeslot and a frequency hopping sequence (in a frequency hopping system). In a CDMA system a basic physical channel is defined by a code and possibly also one frequency. A basic physical channel can be used to communicate with one radio unit at a time (e.g., a traffic channel in GSM) or to several radio units collectively (e.g., the Broadcast channel in GSM). In a packet-data radio system one physical channel can also be shared between several users, so that the system lets the radio units take turns transmitting/receiving packet data units on the basic physical channel (e.g. a packet data channel in GPRS).

A speech traffic channel is defined as a logical channel used for communicating one speech session. One speech traffic channel can be mapped on one or several basic physical channels. A speech traffic channel can also be mapped on a fraction of one basic physical channel. Two examples are the GSM full rate speech channel which is mapped on exactly one basic physical channel, and the GSM half rate speech channel which is mapped on half of a basic physical channel. One technique used to reduce the interference generated by the speech session is Discontinuous Transmission mode (DTX). DTX, which is defined e.g. in GSM, can be used for the uplink and/or the downlink. Uplink DTX means that when the user on the radio unit side is silent (not talking), the radio unit does not transmit anything over the radio channel (the speech channel) Rather, during these periods the receiving side (the receiver at the base transceiver station in this case) generates comfort noise to be forwarded to the listener. Downlink DTX works similarly on the downlink. Here it is the transceiver that does not transmit during periods of silence, and it is the radio unit that generates comfort noise to the earphone in the mobile station. DTX for GSM is defined in the GSM Technical Specification TS GSM 06.12 and 06.31.

A packet data channel, i.e., a logical radio channel used for packet switched transmission of data, is used for transmission of a set of radio blocks. One packet data channel can be mapped on one or several basic physical channels. The services supported by a packet data channel can be either real-time services, or non real-time services. The radio blocks can be sent and received sporadically and irregularly over one or more data channels.

In GSM, the radio transmission between base stations and radio units occur in radio bursts. GSM is an 8-slot TDMA system, which means that on a given frequency, eight basic physical channels are defined by letting channel one consist of bursts number 1, 9, 17, . . . on timeslot 1, 9, 17, . . . , channel 2 consist of bursts number 2, 10, 18 . . . on timeslot 2, 10, 18 etc. This is true both for the uplink, where the radio units on the eight basic physical channels take turns transmitting bursts, and for the downlink, where the base station take turns transmitting bursts to the eight radio units.

In each base station there are one or more radio transceiver units (TRX). In the uplink radio communication (radio unit to base station), the transceivers are responsible of receiving the radio signals from the radio units within the cell. In the downlink radio communication (base station to radio unit) the transceivers transmit the radio signals from the base station to the radio units within the cell. In a GSM system utilising prior art, each transceiver supports exactly eight basic physical channels (thanks to the 8-slot TDMA structure in GSM). The eight basic physical channels supported by one transceiver are located on time slots 0 . . 7 on the same frequency (non-frequency hopping system) or on time slots 0 . . 7 in the same frequency hopping sequence (frequency hopping system). Hence, in a GSM system using prior art, the number of basic physical channels in a cell is at most eight times the number of transceivers. If extra basic physical channels are to be added to the cell, one or more additional transceivers have to be added.

One example of a technique for transmitting packet data units on a data channel is the GPRS (General Packet Radio Service), which is used in GSM.

In a GPRS-system, incoming packet data units (e.g. IP packets) are segmented into smaller packet data units, "LLC frames" in an LLC protocol layer in the system. The LLC frames are then addressed and submitted to an RLC protocol layer where the LLC frames are segmented into even smaller data units, "RLC blocks" or "radio blocks". In GPRS, the radio blocks are sized to 456 bits to fit four normal GSM bursts. Each radio block is then transmitted in four consecutive normal bursts on one basic physical channel. A basic physical channel in GSM/GPRS configured to carry GPRS radio blocks is called a packet data channel, PDCH. When all radio blocks associated with an LLC frame have been successfully received by the receiving radio unit or base station, the LLC frame is reconstructed in an RLC protocol layer and passed on to an LLC protocol layer for further processing.

The PCT patent applications WO 98/57509 and WO 96/09708 describe methods and means for transmitting both speech and data on one and the same basic physical channel. The basic physical channel is primarily used for speech. When the basic physical channel is put in a discontinuous transmission mode (DTX) the same basic physical channel is used for data transmissions. This means that speech and data are multiplexed on the basic physical channel, which increases the capacity in the system. It should be noted that according to GPRS phase 1 this method of multiplexing speech and data on the same basic physical channel is not supported by the standard.

As will be seen herein, each of the methods and means disclosed in these patents are of different types than the methods and means of the present invention.

SUMMARY

The present invention meets some problems related to base stations in a cellular radio communication system supporting both speech and data channels.

One problem occurs when a cell is to be configured with a number of basic physical channels. With prior art one costly transceiver unit has to be used for each set of eight basic physical channels in the cell. Another problem occurs when the capacity of the cell, and hence the number of basic physical channels, needs to be increased. With prior art, this means that the number of costly transceiver units has to be increased.

In light of the foregoing, a primary object of the present invention is to provide methods and means for reducing the number of costly transceiver units needed in a base station supporting both speech and data channels.

In a method according to the present invention, transceiver units allocated for communication on speech traffic channels supports one or more packet data channels whenever their speech traffic channels are in discontinuous mode.

According to one embodiment of the method, a transceiver unit supporting at least one ongoing speech call on a first basic physical channel uses downlink DTX periods to transmit radio blocks on a second basic physical channel. According to the same method, the network uses uplink DTX periods to receive uplink radio blocks on the second basic physical channel.

An advantage with the present invention is that the cost for each base station in the cellular radio communication system is reduced. No extra transceiver units are needed for the data communication.

Another advantage is that the invention can be implemented without any changes in the hardware, and can thus be implemented as a software upgrade in existing networks.

Yet another advantage is that in a cellular radio system that presently carries speech only, each cell can be configured with additional basic physical channels carrying packet data without adding expensive transceiver units to the system.

Still another advantage is that in a GSM system supporting both circuit switched speech and GPRS and/or EDGE, each transceiver unit can support more than eight basic physical channels.

DETAILED DESCRIPTION OF EMBODIMENTS

Figure 1A:
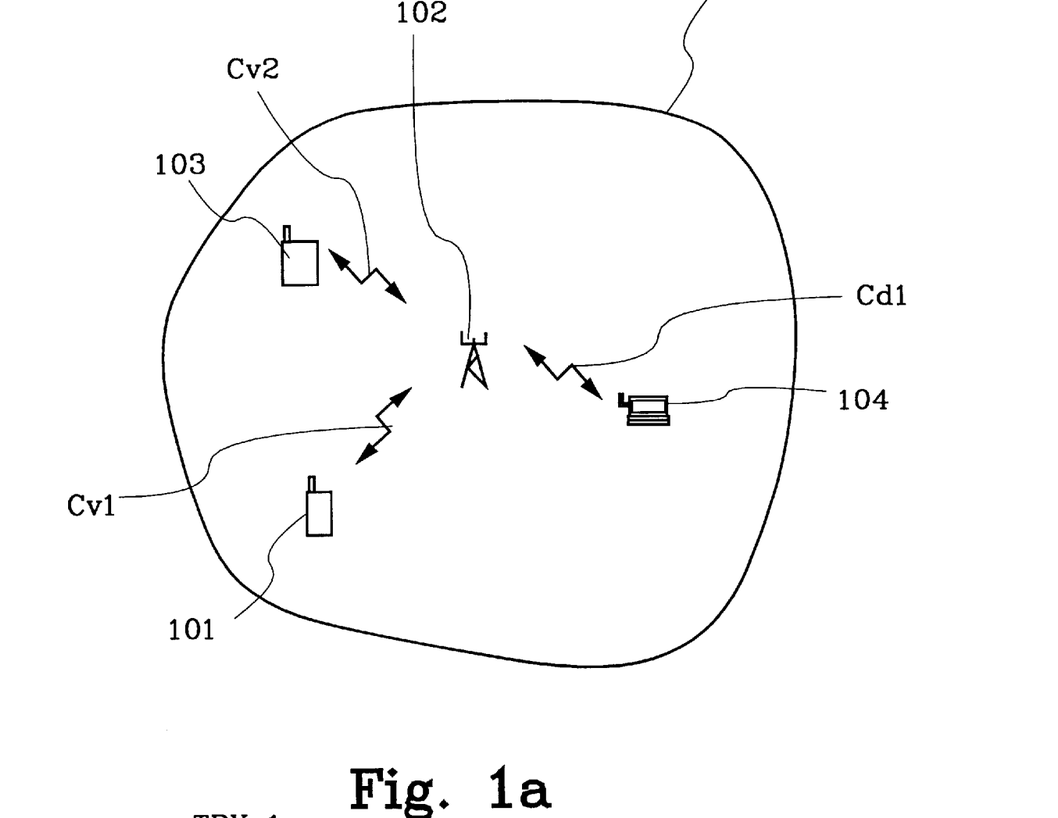
FIG. 1a is illustrating a schematic view of a cell in a cellular radio communication system.
Figure 1B:
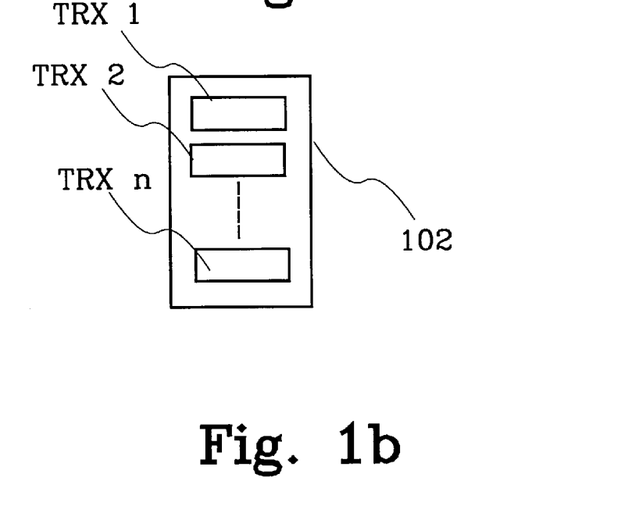
FIG. 1b is illustrating a schematic block diagram of a base station.

The present invention relates to methods and means for transmitting packet data units in a cellular radio communication system. FIG. 1a illustrates an example of a cell 100 in a cellular radio communication system. A first radio unit 101 is communicating a speech call with a base station 102 (also called a base transceiver station, BTS, or more generally a radio node) on a first basic physical channel in the cell 100. This is e.g. performed by mapping a first speech traffic channel Cv1 on the first basic physical channel. A second radio unit 103 is communicating a speech call with the base station 102 on a second basic physical channel on which a second speech traffic channel Cv2 is mapped. A third radio unit 104 is communicating packet data units with the base station 102 on a third basic physical channel. This is e.g. performed by mapping a packet data channel Cd1 on the third basic physical channel. The base station 102 comprises a number of transceiver units TRX1–TRXn, as schematically illustrated in FIG. 1b, for transmitting and receiving signals to the radio units.

Figure 2:
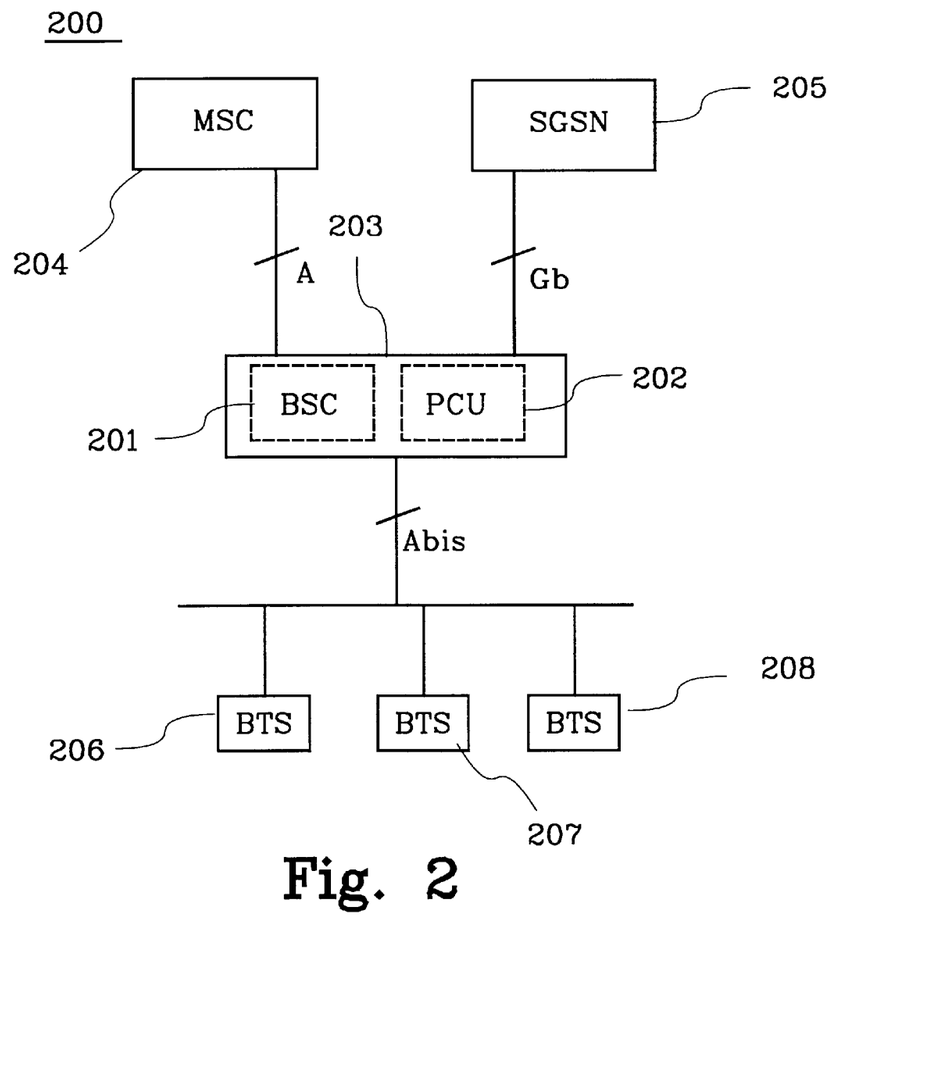
FIG. 2 is illustrating a schematic block diagram of an embodiment of a system according the present invention.

FIG. 2 illustrates a schematic block diagram of a first embodiment of a system according to the present invention, for a combined GSM/GPRS system 200. A base station controller (BSC) 201 is arranged together with a packet control unit (PCU) 202 in a Base Station System unit (BSS) 203. The BSC 201 is used for controlling such functions as handover and power control and the PCU 202 is used for processing packet data units etc. The BSC 201 is connected to a mobile switching centre (MSC) 204 by an A-interface.

The MSC 204 is used for switching speech calls between the base station system BSS 203 and the Public Switched Telephone Network, or for switching calls between the base station system 203 and other MSCs. The A-interface is used for communication between BSS 203 and MSC 204.

The PCU 202 is connected to a serving GPRS support node (SGSN) 205 by a Gb-interface. In accordance with the GSM Technical Specification 03.60, the PCU can be positioned either in the SGSN, in the BSC or in the BTS. In the examples in this document we assume that the PCU is positioned in the BSC. It should be understood by anyone skilled in the art that the inventive technique can be used also in systems where the PCU is located outside the BSC. The SGSN 205 is used for routing packet data units between the PCU 202 and an external packet data network, or for routing packet data units between the PCU and other SGSNs. The SGSN 205 is also used for segmenting and reconstructing packets, for mobility management and for a set of other functions as defined in the GSM technical specification 03.60.

The BSS-unit 203 is connected to a first, second and third base station (BTS) 206–208, respectively by an Abis-interface. The Abis-interface is used for communication between the BSS-unit 203 and the BTS's. The Abis interface transports packet data units, so called Abis packet data units or PCU frames, between the BSS unit 203 and the BTSs. Each Abis packet data unit can contain one speech frame or one MAC/RLC packet data unit. One Abis packet data unit could possibly contain more than one, or a fraction of one, MAC/RLC packet data unit depending on implementation.

Each of these base stations is serving a cell, e.g. a cell similar to cell 100 in FIG. 1a, with 24 speech channels. As previously stated, GSM is an 8-slot TDMA system. Using prior art, this means that the number of basic physical channels a cell can support is limited by eight times the number of transceiver units in the cell (in a frequency hopping system as well as in a non-frequency hopping system). Utilising the method according to the present invention described below, each cell can support more basic physical channels than eight times the number of transceiver units in the cell (in a frequency hopping system as well as in a non-frequency hopping system). A typical cell configuration is today 3 transceiver units in the cell. With prior art, this cell supports 24 basic physical channels. Using a method according to the present invention described below, the same cell would be able to support more than 24 basic physical channels. Exactly how many channels each transceiver unit in the cell can support using the method according to the present invention depends on the total number of transceiver units, the mixture of speech traffic and data traffic and the DTX pattern in the speech sessions. As an example, in a typical GSM cell with equal amount of speech and data traffic and utilising the method according to the present invention, each transceiver unit can support 12 basic physical channels.

Figure 3A:
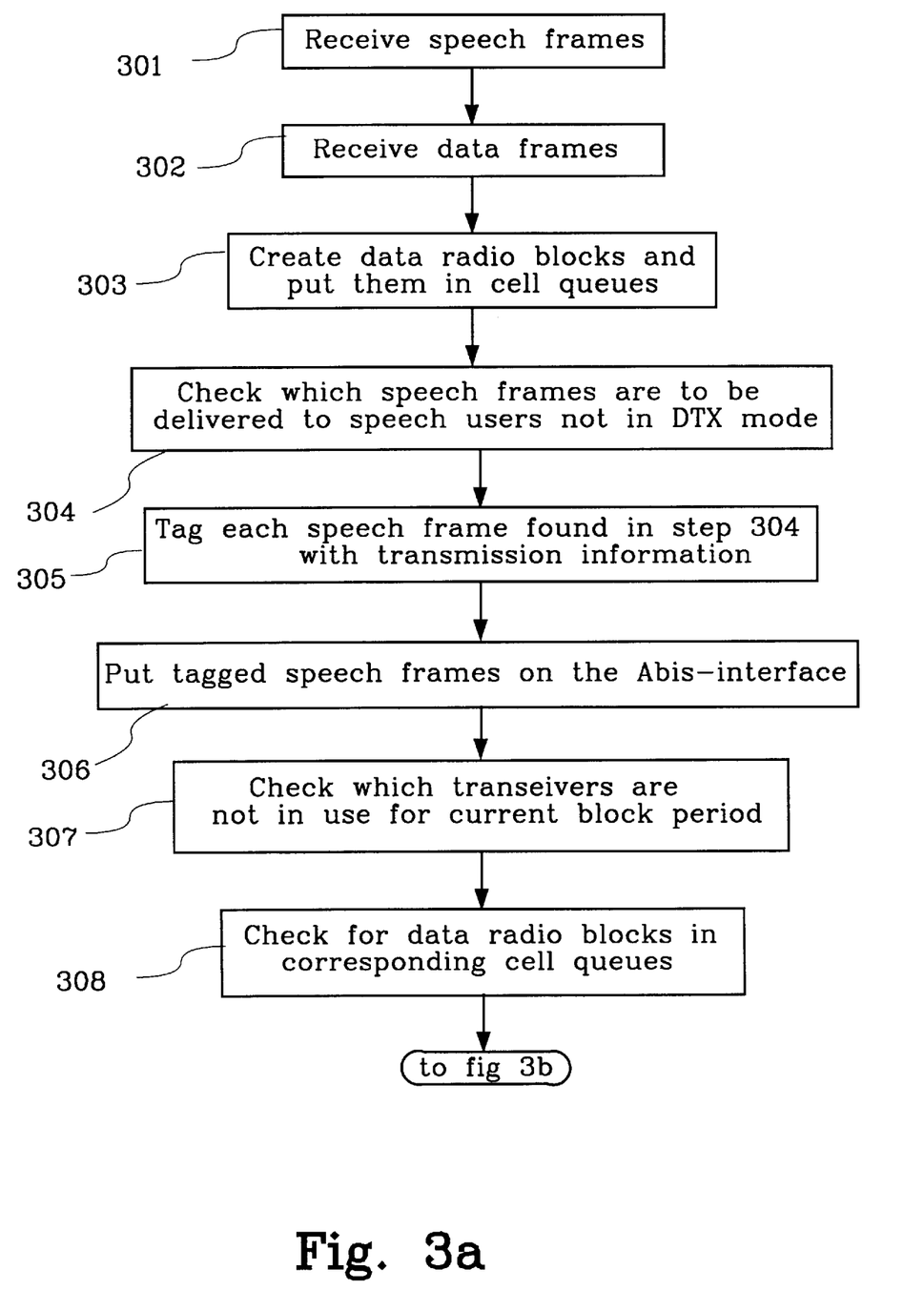
FIGS. 3a and 3b are illustrating a flow chart of a first embodiment of a method according to the present invention.
Figure 3B:
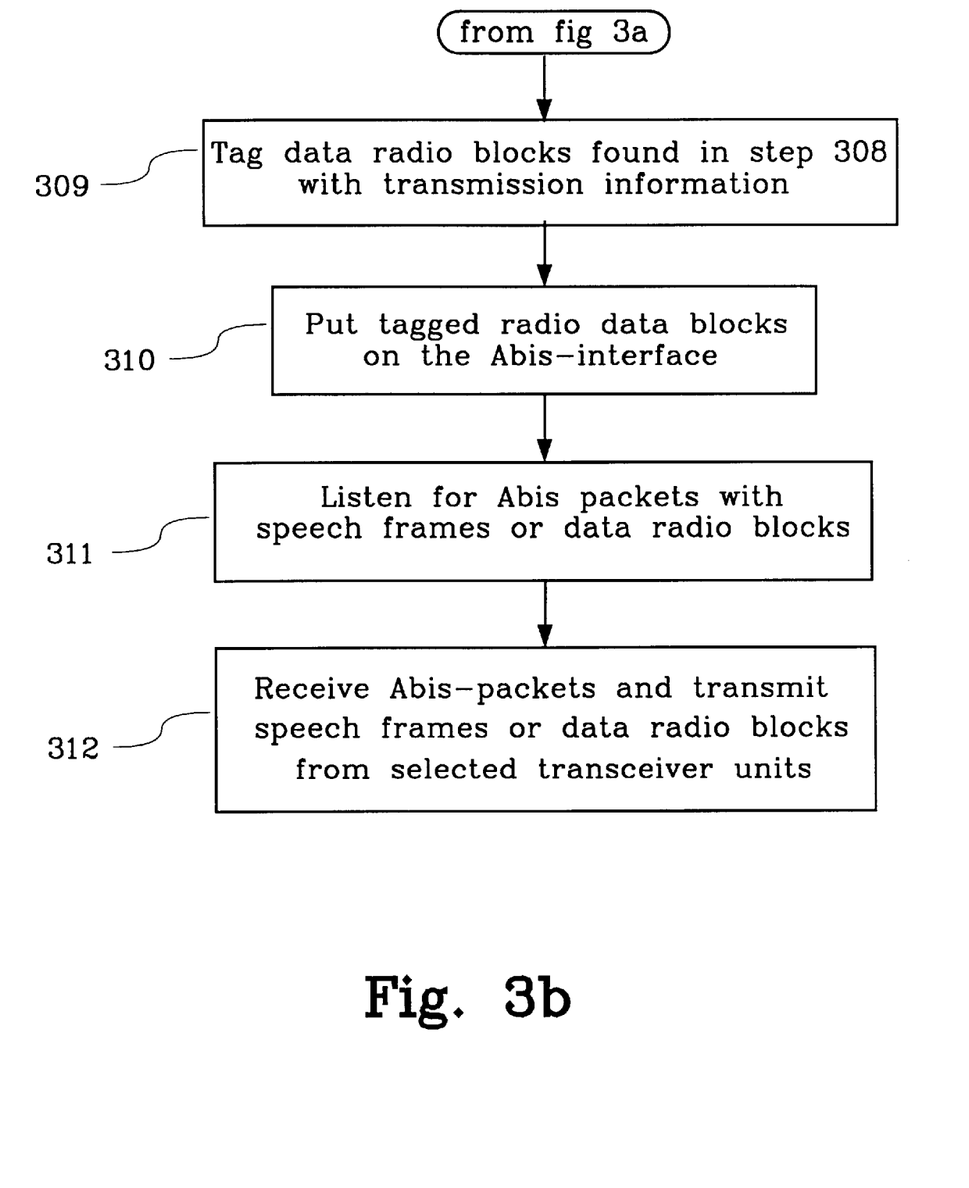

FIGS. 3a and 3b illustrate a flow chart of a first embodiment of the method according to the present invention, performed in the combined GSM/GPRS system 200 in FIG. 2.

According to a step 301 in FIG. 3a, the BSC 201 receives speech frames from the MSC 204 over the A-interface.

According to a step 302, the PCU 202 receives LLC frames (i.e. packet data units) over the Gb-interface from the SGSN 205.

According to a step 303, the PCU 202 creates from the LLC frames addressed data radio blocks, in GSM called MAC/RLC packet data units, which are put in queues in the PCU 202, e.g. one queue for each cell.

According to a step 304, the BSC 201 checks, for each cell and for each block period (four consecutive bursts on one basic physical channel), which speech frames are to be delivered to speech users which are not in DTX mode (discontinuous transmission mode). The BSC activates the DTX mode whenever there is no speech on an ongoing speech call and deactivates the DTX mode when the speech is to be resumed according to well known techniques.

According to a step 305, the BSC 201 tags each speech frame found in step 304 with information (transmission information) about to which cell the speech frame shall be transmitted, which transceiver in the corresponding BTS shall transmit the frame, which basic physical channel shall be used (time slot and frequency for a non-frequency hopping system, time slot and frequency hopping sequence in the case of a frequency hopping system), and when the frame shall be transmitted (TDMA frame number). This also means that speech traffic channels for transmitting the speech frames are established (if needed) and mapped on the selected basic physical channels.

According to a step 306, the BSC 201 puts the tagged speech frames on the Abis-interface for distribution, in the form of Abis-packets, to the correct transceiver according to the tagged-on information.

According to a step 307, the BSC 201 checks which transceivers are not used for the current block period. A transceiver can be free either because there is no ongoing speech call, or because the speech call is in DTX mode. The BSC activates the DTX mode whenever there is no speech on an ongoing speech call and deactivates the DTX mode when the speech is to be resumed according to well known techniques.

According to a step 308, the BSC 201 checks, for each cell with at least one free transceiver, for data radio blocks in the corresponding cell queue in the PCU 202.

According to a step 309 in FIG. 3b, the PCU tags each queued data radio block found in step 308 with information (transmission information) about the cell in which the radio block shall be transmitted, which transceiver unit shall transmit the radio block, which basic physical channel shall be used (mapping), and when the radio block shall be transmitted (TDMA frame number), as with the speech frames in step 305. The basic physical channel to which a queued data radio block is assigned is a different basic physical channel than the one used for transmitting speech frames on the free transceiver unit found in step 307. This also means that packet data channels for transmitting the packet data are established (if needed) and mapped on the selected basic physical channels.

According to a step 310, the PCU puts the tagged data radio block(s) on the Abis-interface for distribution, in the form of Abis-packets, to the correct transceiver (which is/are in DTX-mode) according to the tagged-on information.

According to a step 311, the base transceiver stations (BTS) listens for Abis-packets comprising speech frames or data radio blocks from the BSC 201.

According to a step 312, the base transceiver stations collects the Abis-packets addressed to their respective transceiver, and the contained speech frame or data radio block is transmitted, according to the tagged-on information, on the selected physical channel. This means that a first transceiver can transmit speech frames on a first basic physical channel and then during a DTX mode (when the transceiver is free from any speech call) transmit data radio blocks on a second basic physical channel. The speech frames are tagged with the first basic physical channel in step 305 and the data radio blocks are tagged with the second basic physical channel in step 309.

In a base transceiver station with more than one transceiver, the transceivers all help out to support at least one basic physical channel for data packet transmissions by switching the transmission between different transceivers in DTX mode. This switch is made in step 307 where the method checks for free transceivers in the base stations and hence controls the tagged on information on each data radio block in step 309 regarding which transceiver unit that shall transmit the radio blocks.

From what is said above, it should be clear to anyone skilled in the art that the method described in FIGS. 3a–b can be used on the uplink as well as on the downlink.

Figure 4:
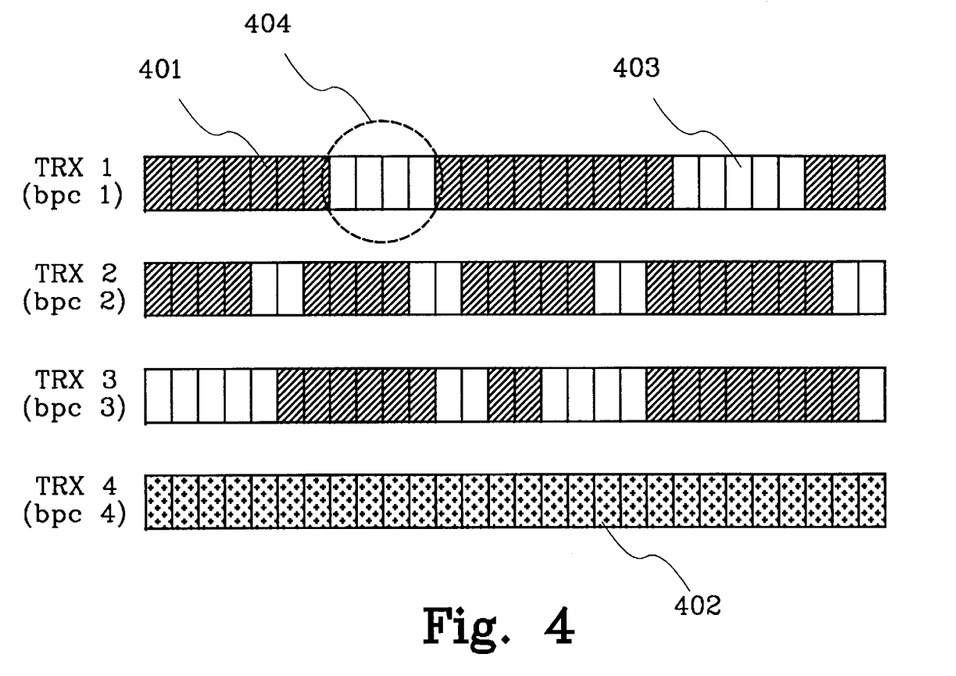
FIG. 4 is illustrating a view of a transmission scenario according to known methods.

FIG. 4 illustrates a transmission scenario where a cell utilising prior art supports 32 basic physical channels on four transceiver units. For simplicity only the four basic physical channels bpc1–4 on timeslot seven in the cell are illustrated. Each set of four basic physical channels on any of the other time slots can be similarly described. Each box in FIG. 4 represents four bursts on timeslot 7. These four bursts can carry one speech frame 401, one radio data block 402 or be idle 403 (no transmission). Due to DTX, the transceivers carrying speech calls on speech channels (here TRX1, TRX2, and TRX3) are not used during DTX periods 404 (one or more consecutive idle boxes 403). The transceiver unit TRX4 is carrying a packet data channel on a basic physical channel bpc4. Depending on the traffic load, part of or all of the packet data channel is utilised for transmitting packet data units.

Figure 5:
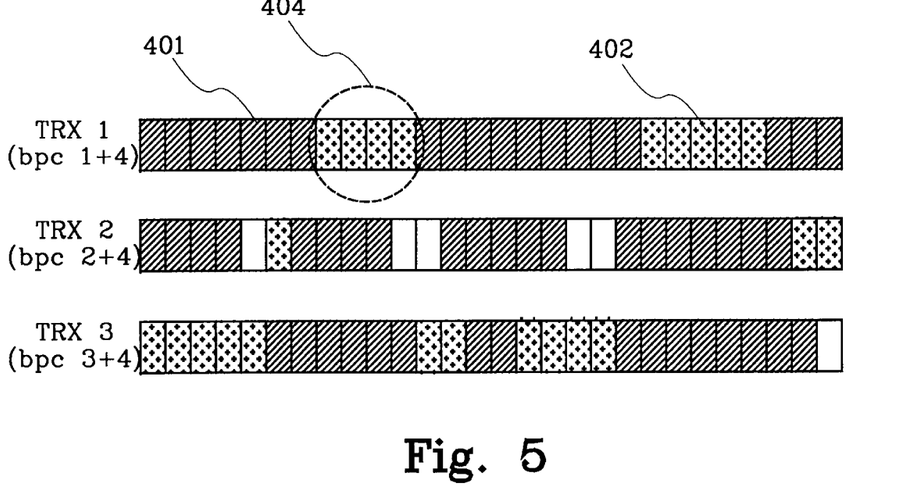
FIG. 5 is illustrating the scenario in FIG. 4 but utilising the method according to the present invention.

FIG. 5 illustrates the same scenario as in FIG. 4 but utilising the inventive method according to FIGS. 3a–b. Only three of the transceivers, TRX1–TRX3, are used compared to four in FIG. 4. Periods of DTX 404 on the basic physical channels bpc1–3 on the respective transceiver unit are used to transmit/receive radio data blocks 402 on the basic physical channel bpc4, hence another basic physical channel (used for packet data units) than their "ordinary" basic physical channels (used for speech).

Figure 6:
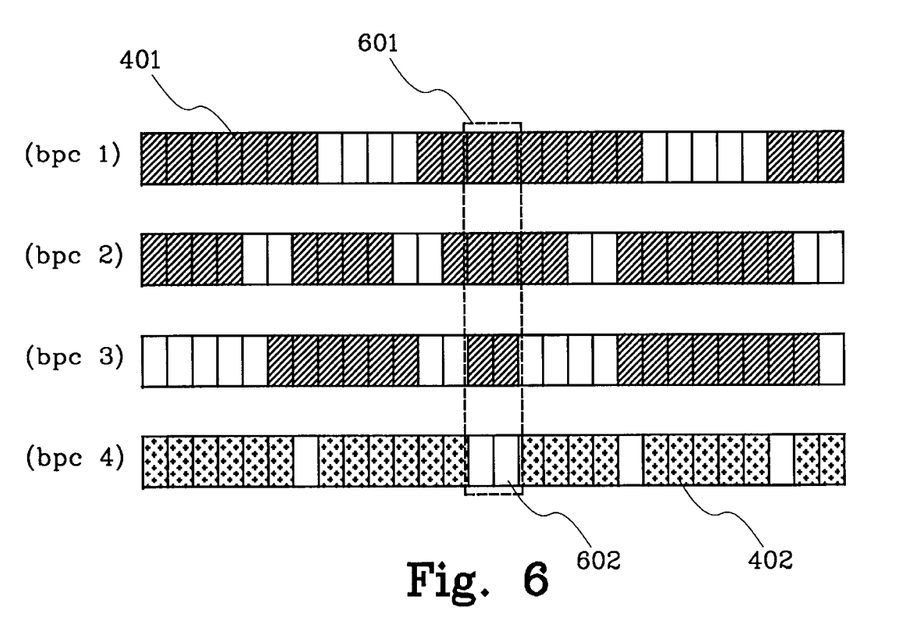
FIG. 6 is illustrating the result usage of the basic physical channels in FIG. 5.

FIG. 6 illustrates the resulting usage of the respective basic physical channel bpc1–4 in FIG. 5. The packet data channel on the basic physical channel bpc4 is supported to almost 100%. During block periods 601 when none of the speech calls on the speech channels (bpc1–3) is in DTX mode, no radio blocks can be communicated (sent/received) on the packet data channel bpc4. This means that basic physical channel bpc4 can not be used for a speech call. The interruptions 602 in bpc4 forced by simultaneous non-DTX periods on transceivers TRX1, TRX2 and TRX3 would cause bad speech quality on basic physical channel bpc4. This is no problem in e.g. GPRS since the interruptions 602 on bpc4 do not pose a serious problem to data applications. Indeed, each GPRS radio unit/base station will interpret the missing radio blocks just as if the channel is used to communicate with, i.e. transmit radio blocks to or receive radio blocks from, another user in the cell. Hence, the only effect of the missing radio blocks is to slightly reduce the effective throughput on the GPRS channel.

From what is said above, it should be clear to anyone skilled in the art that the invention can be used in a system using frequency hopping as well as in a system that does not use frequency hopping.

The inventive method combines the DTX-induced periods of radio silence on speech channels with the GPRS capability of using radio channels with sporadic transmission. These two features are used to support more than eight physical channels on one transceiver in a combined GSM/GPRS system. It should be noted that a packet data channel on a basic physical channel can run real-time services like speech and not only non real-time services.

Although the invention has mainly been described by referring to a GSM system the inventive method can be applied in a D-AMPS/EDGE system and also in a CDMA system. In a CDMA system, the number of basic physical channels a transceiver can support is determined by the total maximum output power the transceiver can use. Hence the inventive technique can be applied also to the CDMA system to increase the number of logical channels one transceiver can support. As exemplified in the GSM/GPRS system, a speech call in DTX mode can be made not to load the transceiver. As in the preferred embodiment in the GSM/GPRS scenario, the inventive technique uses this fact to allow the packet data channel to be supported by the transceiver where one or more speech calls are in DTX mode. It should be obvious to anyone skilled in the art how this generalization to the CDMA system is done.

What is claimed is:

1. A method for communicating packet data units in a radio communication system including a first base station supporting both speech and data packet communication with a number of radio units, where said first base station includes a first transceiver unit communicating a speech call with a first radio unit on a speech traffic channel mapped on a first basic physical channel, and where a discontinuous transmission mode can be activated on said first speech traffic channel, characterised in that the method comprises the step of:

communicating packet data units between said first transceiver unit and a second radio unit on a packet data channel mapped on a second basic physical channel when said discontinuous transmission mode is activated on said first speech traffic channel and where said second basic physical channel is different from said basic physical channel; and switching said second basic physical channel with said mapped packet data channel from said first transceiver unit to a second transceiver unit in said first base station if said discontinuous transmission mode on said first speech traffic channel is deactivated and a discontinuous transmission mode on a second speech traffic channel mapped on a third basic physical channel in said second transceiver unit is activated.

2. The method as claimed in claim 1, wherein said communication is performed on the downlink.

3. The method as claimed in claim 1, wherein said communication is performed on the uplink.

4. The method as claimed in claim 1, wherein said first and second radio units are one and the same radio unit.

5. The method as claimed in claim 1, wherein said first basic physical channel is a time slot on a first frequency and said second basic physical channel is a time slot on a second frequency in a TDMA system.

6. The method as claimed in claim 1, wherein said discontinuous transmission mode is a DTX mode in a GSM system.

7. The method as claimed in claim 1, wherein said packet data channel is used for communicating GPRS data packet data units.

8. The method as claimed in claim 1, wherein said radio communication system is a combined GSM and GPRS system.

9. The method as claimed in claim 1, wherein said first and second basic physical channels are frequency hopping channels.

10. The method as claimed in claim 1, wherein said first and second basic physical channels are defined by certain codes in CDMA system.

11. A method for communicating packet data units in a radio communication system including a first transceiver unit, the method comprising the steps of:

a) establishing a first speech traffic channel on at least a part of a first basic physical channel assigned to said first transceiver unit;

b) communicating speech on said first speech traffic channel;

c) activating a discontinuous transmission mode on said first speech traffic channel;

characterised in that said method further comprises the steps of:
- d) establishing a packet data channel on at least a part of a second basic physical channel assigned to said first transceiver unit, and where said second basic physical channel is different from said first basic physical channel;
- e) communicating packet data units an said packet data channel during said discontinuous transmission mode;
- f) stopping said communication of packet data units on said packet data channel in said first transceiver unit and resuming said communication of speech on said first speech traffic channel when said discontinuous transmission mode is deactivated;

wherein said system includes a second transceiver unit communicating on a second speech traffic channel mapped on at least a part of a third basic physical channel and where step f) further comprises the steps of:

- g) checking if said second speech traffic channel on said second transceiver unit is in discontinuous transmission mode;
- if so, continue to communicate said packet data units on said packet data channel by switching said second basic physical channel to said second transceiver unit during said discontinuous transmission mode of said second speech traffic channel.

12. A method as claimed in claim 11, wherein said first and second transceiver units are arranged in a first base station.

\* \* \* \* \*